UNITED STATES PATENT OFFICE.

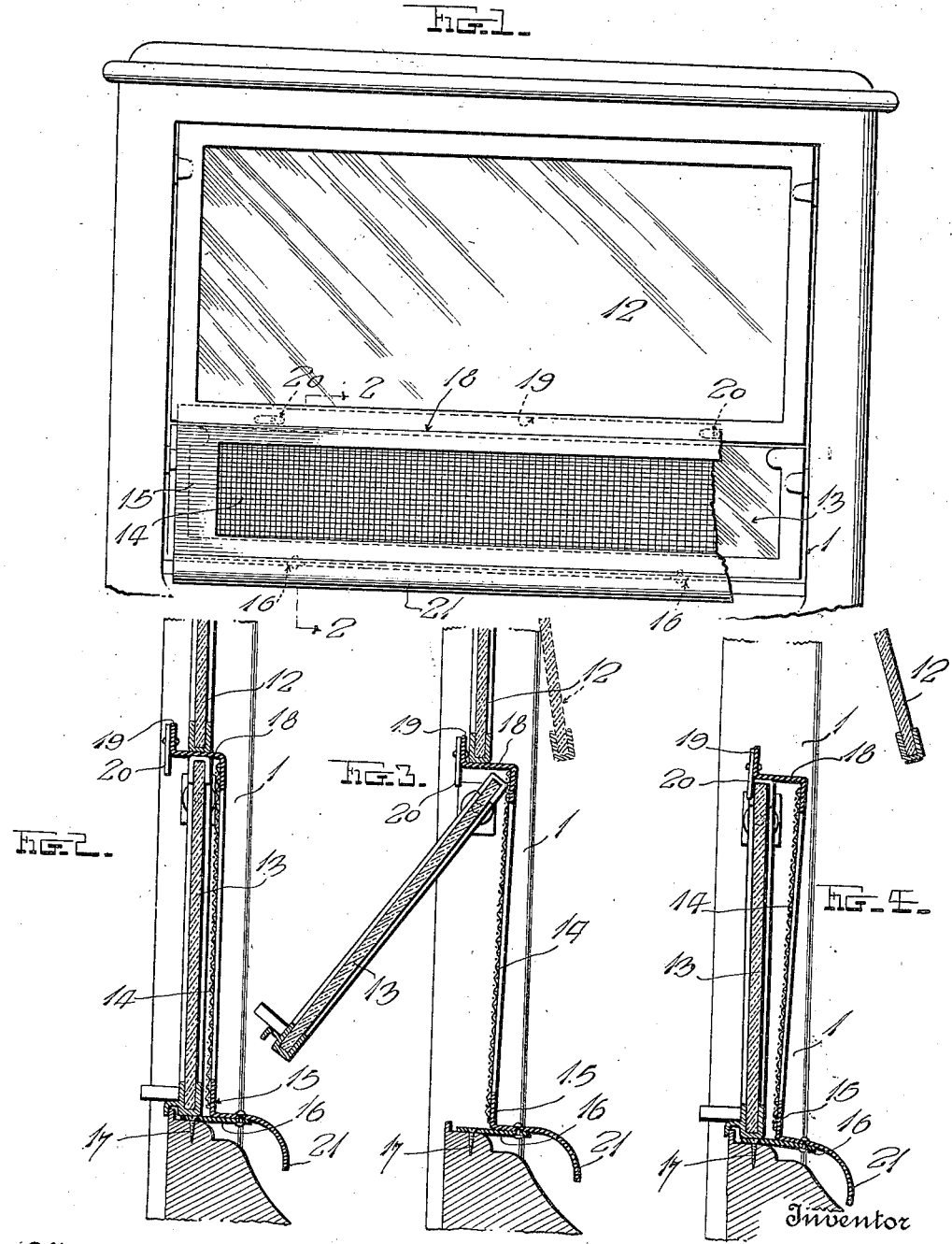

WILLIAM B. HERBST, OF COLUMBUS, INDIANA.

SCREEN FOR INCLOSED-AUTOMOBILE BODIES.

1,312,542.   Specification of Letters Patent.   Patented Aug. 12, 1919.

Application filed August 28, 1918.   Serial No. 251,849.

*To all whom it may concern:*

Be it known that I, WILLIAM B. HERBST, a citizen of the United States, residing at Columbus, in the county of Bartholomew and State of Indiana, have invented certain new and useful Improvements in Screens for Inclosed-Automobile Bodies; and I do declare the following to be a full, clear, and exact description of the invention, such as will enable others skilled in the art to which it appertains to make and use the same.

My invention has for its object to provide for the screening of the wind shield frame and the window frames of inclosed automobile bodies, such as sedans and limousines, whereby to prevent the entrance of insects, leaves, and the numerous forms of foreign matter encountered in motoring.

With the foregoing object in view, the invention resides in the novel features of construction and unique arrangements of parts hereinafter fully described, claimed, and shown in the accompanying drawings.

Figure 1 is a front elevation of the wind shield and adjacent parts of an inclosed automobile body showing the screen employed in connection with the shield.

Fig. 2 is a vertical section on the plane of the line 2—2 of Fig. 1 showing both sections of the wind shield closed.

Fig. 3 is a view similar to Fig. 1 but illustrating the manner in which the lower portion of the wind shield frame is screened when the lower section of the shield is swung rearwardly.

Fig. 4 is another sectional view illustrating the manner in which the upper section of the wind shield may be swung forwardly.

In the drawings above briefly described, a portion of an inclosed automobile is shown, the body of the machine being provided with a wind shield frame 1, which is provided with upper and lower hinged wind shield sections 12 and 13, both of which may swing in the usual manner as will be clear from Figs. 3 and 4. When the rear section 13 is swung rearwardly, the lower portion of the frame 1 is closed by a screen 14 having a metallic frame 15, the lower edge of said frame having rearwardly extending strips 16 secured by screws or the like 17 to the lower side of the wind shield frame, while the upper edge of said screen is provided with a rearwardly extending flange 18 receivable between the upper and lower wind shield sections 12 and 13 as seen in Fig. 3, the rear edge of said flange 18 being turned upwardly at 19 in rear of the lower edge of the section 12. By this arrangement at the upper edge of the screen, the entrance of rain between the two sections of the wind shield is prevented, which is of great advantage, since the upper and lower sections of the wind shield now commonly fit so loosely as to permit a great deal of water to enter in a driving rain storm. The device eliminates the necessity of the rubber wind shield strip.

As shown in Fig. 3, the flange 18 is of sufficient width to allow ample movement of the screen 14 when swinging the wind shield section 13 rearwardly, and in order that the upper section 12 may be swung outwardly without allowing the upper edge of the screen frame 15 to tilt forwardly an undesirable distance, suitable stops 20 depend from the upturned flange edge 19 in rear of the section 13. (See more particularly Fig. 4). The strips 16 are of sufficient resiliency to swing the screen 14 forwardly when the section 12 is opened thus holding the stops 20 in contact with the section 13 and preventing rattling. If desired, a cowl 21 may be formed on the lower edge of the frame 15 to present a more attractive appearance and to assist in preventing water from beating in under the lower wind shield section 13.

By the arrangement shown and described, insects leaves and all objectionable matter carried in the air, are excluded, yet the machine will be well ventilated and maintained at a comfortable temperature, which cannot be done by closing the wind shield, in hot weather. Since excellent results have been obtained from the features shown and described they are preferably followed, but within the scope of the invention as claimed, numerous minor changes may well be made.

It will be observed that the lower edge of the screen 14 is in close proximity to the lower end of the wind shield frame, to prevent the entrance of bugs, insects and other foreign matter and said screen is positioned immediately in front of the lower wind shield section when the shield is closed as in Fig. 2. By this arrangement, when traveling in wind storms, there is no danger of the screen being torn loose from the machine, since the wind will blow said screen back against the heavy glass wind shield which will reinforce it against injury in any manner. Furthermore, by the disposition of the screen illustrated, when over hanging branches along the road strike the screen, it will be supported against rearward bulging or tearing by engagement with the lower wind shield section.

I claim:

1. The combination with an automobile wind shield frame and upper and lower swinging wind shield sections mounted in said frame; of a screen in front of the lower section, and a flange on the upper edge of said screen extending rearwardly between the two sections and turned upwardly at its rear edge behind the lower edge of said upper section to prevent water from entering between said sections.

2. A structure as specified in claim 1, together with stop means depending from said flange in rear of the lower wind shield section to prevent forward movement of the screen when the upper section is swung outwardly.

3. A structure as specified in claim 1, together with stop means depending from said flange in rear of the lower wind shield section to prevent forward movement of the screen when the upper section is swung outwardly, and a strip extending rearwardly from the lower edge of said screen and secured to the lower end of said frame.

4. The combination with a wind shield comprising upper and lower sections and a frame in which they are mounted, said lower section being pivoted near its upper edge for rearward swinging, of a screen positioned in said frame in close proximity to the front of said lower wind shield section, means at the upper edge of said screen for retaining said edge in place and for permitting slight forward tilting of the screen when the lower wind shield section is swung rearwardly, and means for connecting the lower edge of said screen with the frame and for allowing the aforementioned forward tilting of the former.

5. In a device of the character described, a screen adapted to be disposed in front of the lower section of a wind shield, means, including a flange extending rearwardly from the upper end of the screen and receivable between the upper and lower windshield sections, for holding said upper end of said screen in place and for permitting slight forward tilting thereof, and means for mounting the lower end of said screen in close proximity to the lower end of the wind shield frame and for permitting the aforesaid forward tilting of the screen.

6. In a device of the character described, a screen adapted to be disposed in front of the lower section of a wind shield, means for attaching the lower end of the screen to the lower end of the wind shield frame, a flange extending rearwardly from the upper end of said screen for reception between the upper and lower wind shield sections, and an additional flange rising from said first named flange for disposition at the rear side of the upper wind shield section.

In testimony whereof I have hereunto set my hand.

WILLIAM B. HERBST.